(12) United States Patent
Roos

(10) Patent No.: US 7,184,442 B1
(45) Date of Patent: Feb. 27, 2007

(54) BUFFER MANAGEMENT METHOD AND APPARATUS

(75) Inventor: Joachim Roos, Nacka (SE)

(73) Assignee: Net Insight AB, Stockholm (SE)

( * ) Notice: Subject to any disclaimer, the term of this patent is extended or adjusted under 35 U.S.C. 154(b) by 0 days.

(21) Appl. No.: 10/009,551

(22) PCT Filed: May 3, 2000

(86) PCT No.: PCT/SE00/00849

§ 371 (c)(1),
(2), (4) Date: Mar. 20, 2002

(87) PCT Pub. No.: WO00/67519

PCT Pub. Date: Nov. 9, 2000

(30) Foreign Application Priority Data

May 4, 1999 (SE) .................................. 9901605

(51) Int. Cl.
*H04L 12/28* (2006.01)
*H04L 12/43* (2006.01)
(52) U.S. Cl. .................................. 370/412; 370/458
(58) Field of Classification Search ........ 370/412–419, 370/458
See application file for complete search history.

(56) References Cited

U.S. PATENT DOCUMENTS

| 4,005,272 A | 1/1977 | Collins et al. ................. 179/15 |
| 4,791,629 A | 12/1988 | Burns et al. ................... 370/85 |
| 4,809,261 A | 2/1989 | Ratcliff ......................... 370/59 |

(Continued)

FOREIGN PATENT DOCUMENTS

EP 0 522 607 B1 6/1996

(Continued)

OTHER PUBLICATIONS

Bohm et al., *The DTM Gigabit Network*, 3 Journal of High Speed Networks 109-26 (IOS Press, 1994).

*Primary Examiner*—Andrew C. Lee
(74) *Attorney, Agent, or Firm*—Finnegan, Henderson, Farabow, Garrett & Dunner, L.L.P.

(57) ABSTRACT

The present invention relates to methods and an apparatus for switching data. According to the invention, storage means providing three or more frame buffers are used for temporarily storing frames of time slot data received via an input port of said apparatus. Read and write pointers are provided to designate which of said frame buffers that are used to be read/write accessed at each point in time. Control means are provided for controlling the operation of said pointer means, said control means being arranged initiate said read pointer means by detecting which one of said first signal and said second signal that is received first in time after a selected point in time and to control one or both of said pointer means so that, if said first signal is received first, the frame buffer designated by said write pointer means is at least two frame buffers ahead, in said round-robin fashion, of the frame buffer designated by said read pointer means, or so that, if said second signal is received first, the frame buffer designated by said read pointer means is at least two frame buffers ahead, in said round-robin fashion, of the frame buffer designated by said write pointer means.

33 Claims, 6 Drawing Sheets

U.S. PATENT DOCUMENTS

| | | | |
|---|---|---|---|
| 5,128,929 A | | 7/1992 | Kobayashi ................. 370/58.1 |
| 5,761,203 A | * | 6/1998 | Morales ...................... 370/418 |
| 5,781,533 A | | 7/1998 | Manning et al. ............ 370/236 |
| 5,905,725 A | * | 5/1999 | Sindhu et al. .............. 370/389 |
| 6,636,518 B1 | * | 10/2003 | Liencres ................. 370/395.7 |

FOREIGN PATENT DOCUMENTS

| | | |
|---|---|---|
| SE | 9704067-9 | 5/1999 |
| WO | WO 9207335 A1 | 4/1992 |
| WO | WO99/25099 | 5/1999 |

* cited by examiner

BUFFER MANAGEMENT METHOD AND APPARATUS

TECHNICAL FIELD

The present invention refers to switching of data between at least one input port and one output port of a switch, wherein a frame buffer is used to temporarily store frames of data during said switching.

BACKGROUND

In almost any system that switch data between at least one input port and one output port, means for temporarily storing said data while in the transfer from said input port to said output ports, such as FIFOs and frame buffers, forms part of the design.

In synchronous systems, wherein data on the input and output links are often transferred in essentially fixed size frames, each typically being divided into time slots, use of frame buffers are often preferred.

The function of a frame buffer is to store an entire frame of data during a short period of time and to allow for re-ordering of the slots contained therein. A frame buffer may for example be used to store input frames in such a way that an entire frame of slots is written into the frame buffer with the sequence of slots of the input frame unaffected. When outputted, the slots of the frame are collected from the frame buffer in a random, selective order, thereby providing a desired switching. Alternatively, input slots are written into the frame buffer selectively, thereby providing the desired switching, and the so-created frame of slots is then read out as a whole from the frame buffer.

Irrespective of the way in which a frame buffer is used, it is necessary to make sure that new data written into the buffer does not overwrite old data that have not yet been properly read out therefrom, i.e. to ensure so-called buffer consistency. One way to solve this is to synchronize the writing of frames into a frame buffer and the reading of slots from the buffer according to a common frame synchronization signal. However, if there for example is a phase difference between the frame synchronization signal of the components reading data from the buffer and the frame synchronization signal of the components writing data into the buffer, the task of synchronizing the write and read operations in relation to the buffer becomes more complicated and restricted, typically involving hard-locking the frame synchronization signal of the output components to the frame synchronization signal of the input components in a strict manner. Moreover, when for example switching data from one input port to two or more output ports, this synchronizing problem is further complicated.

SUMMARY

An object of the invention is to provide an easy and efficient way of synchronizing operation in relation to a frame buffer when switching data between an input and an output port, and especially when switching data between one or more input ports and one or more output ports when both time and space switching are required.

This and other objects are achieved by the invention as defined in the accompanying claims.

The invention uses a multiple buffer scheme, in which three or more frame buffers, three being the preferred alternative, are provided for each input port. The invention thus uses so-called input port buffering, i.e. frames received via the input port are written in from frame start to frame end in said three or more frame buffers. Write and read pointers are provided to designate which particular frame buffer that is currently used for writing of data and which particular frame buffer that is currently used for reading of data, respectively, and these pointers are typically advanced on each reception of an input frame synchronization signal and an output frame synchronization signal, respectively, in a round-robin, modulo-3 fashion.

According to one aspect of the invention, there is provided a way of initiating the positioning of said pointers by determining a phase relationship between said input and output frame synchronization signal, and to adjust the pointers accordingly.

An advantage of the invention is that it makes it possible to synchronize write and red operations in relation to the buffer without hard-locking the input frame synchronization signal to the output frame synchronization signal. In other words, the relationship between the input frame synchronization signal and the output frame synchronization signal is relaxed.

According to another aspect of the invention when used in a situation where data from one input port is to be optionally switched to two or more output ports, a read pointer is provided for each input/output port combination. The behavior of a read pointer used when reading data from an input port to a first output port will need then not affect the behavior of a read pointer used when reading data from said input port to a second output port. Another advantage thereof is that such an adjustment will affect data pertaining to one single output frame.

According to another aspect of the invention, there is provided a way of relaxing the relationship between the write and read operations in relation to the write and read pointers by taking into consideration the use of guard bands, fill slots, and similar features of a frame. For example, in a network such as DTM (Dynamic synchronous Transfer Mode), a guard band is provided at the end of each frame. This kind of feature is for example described in the European Patent Application 92201322.2. Consider the situation, in relation to an input/output port combination, when one of the write pointer and the read pointer is advanced into designating the same frame buffer as the other one, thereby causing a state of possible buffer inconsistency. If the operation of the input port for writing payload data into the frame buffer, or the operation of the output port for reading payload data from the frame buffer, is already completed but the associated pointer has not yet moved ahead to the next frame buffer as the respective frame synchronization signal has not yet been received, i.e. the operation is currently in the guard band margin, no actual buffer inconsistency violation will occur, i.e. no actual writing and reading of slots to/from the same frame buffer simultaneously will take place. By taking such a guard band margin into consideration when determining whether or not to cause a frame slip by forcing the pointers to designate different frame buffers, an additional margin is added to accommodate clock differences and jitter.

According to a preferred aspect of the invention, if an adjustment of a pointer in a write/read pointer combination is necessary, typically as a result of a buffer consistency violation, the position of the read pointer only is adjusted and not the position of the write pointer. This has the advantage of affecting only the reading of data to the output port associated with said read pointer and not the output to other ports also reading data from the same three or more buffers. If a write pointer were to be adjusted, all output ports that read data from said three or more buffers of interest would be affected.

To be noted, there are ways of permitting use of a frame buffer for read and write simultaneously, if mechanisms are provided to make sure that data is only read from the portion of the frame buffer that has not yet been overwritten. Such mechanism may be advantageously used in combination with the aspects discussed herein to allow for further margins with respect to the relationship between reading and writing of data.

For further exemplifying description of such mechanisms, as well as for further discussion with respect to the operation of a triple buffering scheme of the kind in which the invention is advantageously implemented, reference is made to the not yet published Swedish Patent Application SE 9704067-9.

As the invention provides for a relaxation of the relationship between the reading and writing of data in relation to a frame memory, and consequently of the relationship between frame synchronization signals of the ports that access said frame memory, the invention is especially advantageous in the context of networks wherein the synchronization requirements are such that each frame synchronization signal may show a limited jitter and may be arbitrarily located in phase in relation to other frame synchronization signals, but may not show any persistent frame drift in relation to other frame synchronization signals. An example of a network of this kind is the above-mentioned DTM network. For further information on such a network, reference is made to "The DTM Gigabit Network", Christer Bohm, Per Lindgren, Lars Ramfelt, and Peter Sjödin, Journal of High Speed Networks, 3(2):109–126, 1994.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

The above mentioned features, embodiments and aspects of the invention will now be further exemplified with reference to the accompanying drawing.

Figure 1:
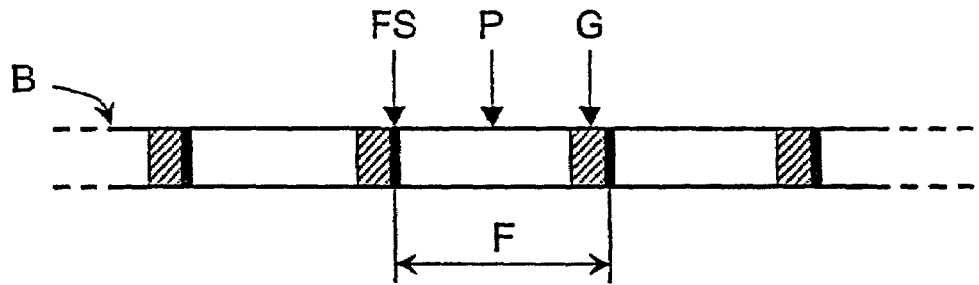
FIG. 1 illustrates a stream of data consistent with the present invention.

To exemplify the structure of frames of time slots of the kind addressed by the invention, FIG. 1 schematically illustrates a stream of data that is divided into essentially fixed size frames F. Throughout this description, it will for exemplifying purposes be assumed that each frame F has a nominal duration of 125 μs. The start of each frame is defined by a frame synchronization signal FS, also referred to below as frame start signal and marked as a thick black line in FIGS. 1 and 3–7. Each frame F is divided into slots (not shown) forming a payload P following the frame start signal within each frame. At the end of each frame, following the payload, a guard band G is added, marked in hatching. The guard band G is a number of bits or slots that are not used for payload and to add separation between frames.

A function of the guard band is to absorb frequency differences between the bit frequencies of a transmitting node and a receiving node. The guard band adds an empty space between frames to handle the situation when the bit frequency of the transmitting node is slightly higher than the bit frequency of the receiving node. To make sure that the receiving node has time to "swallow" the payload before a new frame start signal is due, the amount of payload within the frame is constrained. The size of the guard band necessary for accommodating this difference is calculated for a worst-case ppm deviation between the bit frequencies of any two adjacent nodes.

Another function of the guard band is to absorb jitter on the frame synchronization signal. A main source of this jitter is alignment jitter caused by the re-sampling of the frame start signal from the bit clock of a transmitting node into the bit clock of a receiving node. As jitter cannot be calculated only on a per link and frame basis, but is additive in the network, the guard band size necessary to accommodate for this jitter will typically be greater than the guard band size needed to accommodate for the above-mentioned frequency differences even if means for stabilizing the jitter is added within the network.

Figure 2:
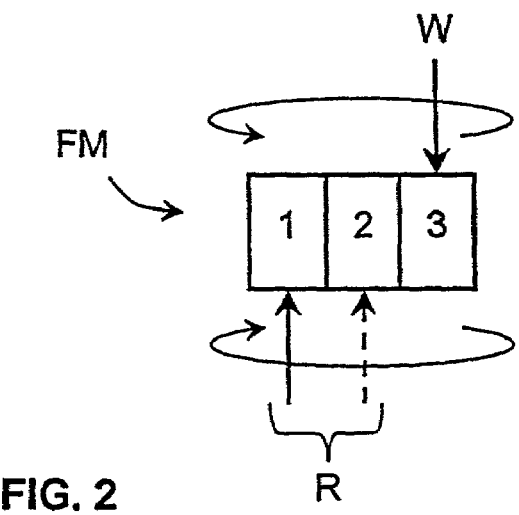
FIG. 2 illustrates a frame memory consistent with the present invention.

FIG. 2 illustrates a frame memory FM comprising three frame buffers 1–3 for temporarily storing frames of slots that has been received from an input port of a switch. The frame memory FM is typically arranged to be accessed by one or more output ports that use the frame memory for data retrieval when transmitting frames of slots from the respective output port. Each one of the three frame buffers has capacity to store one entire frame of slots. For the system to be able to perform full time switching of data, i.e. to transmit the last incoming slot of one input frame as the first outgoing slot of an output frame, and vice versa, one frame buffer is needed. In addition, to avoid that this frame buffer is not updated before data has been read therefrom, a second frame buffer is required. In addition, to accommodate for the fact that in networks such as DTM, an input frame and an output frame may be arbitrarily located in phase as long as there is no accumulated phase drift between the two, a third buffer is needed. To be noted, event though use of more than three frame buffers would add even more margins between the read and write operations in relation to the frame buffers, this would also increase the delay through the switch. The use of three frame buffers for each input port is therefore considered the most preferred embodiment.

As indicated in FIG. 2, while one frame buffer is being updated, the remaining two buffers may be used for data retrieval. The basis for the frame buffer selection for read and write is the use of a modulo-3 counter, which is incremented on each occurrence of the respective frame start signal. For the input port writing data into the frame memory FM, there is provided a write pointer W designating which one of the three buffers that is currently to be used for storing a frame that is currently received via the input port. At each reception of the frame start signal from the input port, the write pointer W is advanced into designating a next one of the three frame buffers in a round robin, modulo-3 fashion. Similarly, for each output port arranged to read data from the frame memory FM, there is provided a read pointer R designating which one of the three frame buffers that is currently to be used for reading slots to be transmitted from the respective output port. At each occurrence of the output port frame start signal, the respective read pointer R is advanced into designating a next one of the three frame buffers in a round robin, modulo-3 fashion.

Consequently, a unique read pointer in the range of 0, 1, 2 is provided for each input/output port combination, which makes it possible to offer completely independent retrieval of data in the stored frames at any speed combination as long as the nominal frame frequency is the same (typically 125 µs). To be noted, in addition to this read pointer, a unique frame buffer entry address coming from a slot mapping table will be provided, at each retrieval, to identify, for each outgoing slot, the specific entry within the frame buffer from which data is to be read.

If, for example, it is assumed that the pointer W is currently pointing at frame buffer 3 in FIG. 2, the read pointer R for an output port may point at frame buffer 1, as indicated by the solid line arrow, or at frame buffer 2, as indicated the dotted line arrow. If the relationship between the input and output frame start signals is such that the write pointer W will be advanced before the read pointer R is advanced, as a result of the fact that the next occurrence of the input frame start signal is before the next occurrence of the output frame start signal, the write pointer W will potentially corrupt data in frame buffer 1, thus making the left read pointer position that is indicated by the solid line arrow invalid. Therefore, the current selected position for the read pointer would in this case be the one that is indicated by the dotted line arrow. Similarly, if the read pointer is currently pointing at frame buffer 2 and if the relationship between the input and output frame start signals is such that the read pointer R will be advanced before the write pointer W is advanced, as a result of the fact that the next occurrence of the output frame start signal is before the next occurrence of the input frame start signal, the read pointer will be advanced into designating the same frame buffer 3 as the one designated by the read pointer W. In such a situation, data may potentially be read before it has been written. Therefore, in this case the currently proper position for the read pointer would be the one that is indicated by the solid line arrow. Thus, the assignment rule for whether to use the read pointer positions indicated by the solid line arrow or the dotted line arrow for reading is based on the phase relationship between the input and output frame start signals.

Figure 3:
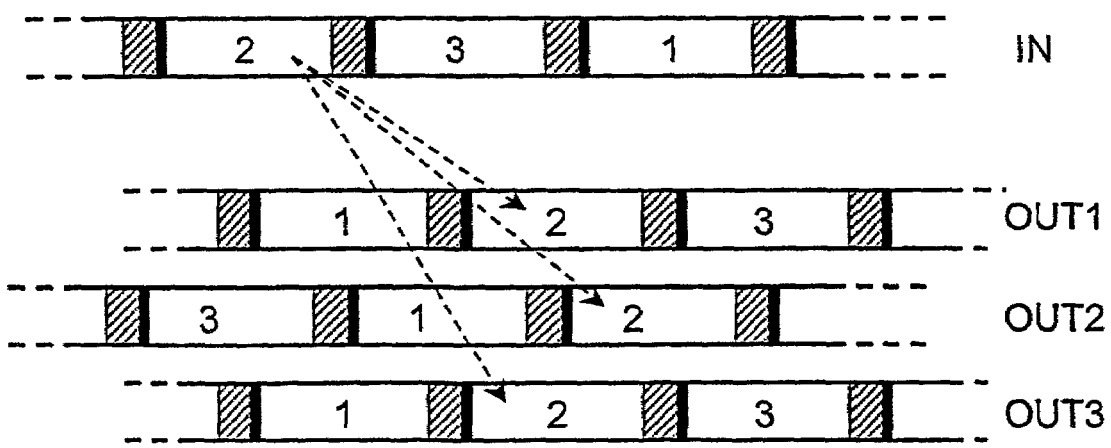
FIG. 3 illustrates frame buffers used for switching data consistent with the present invention.

FIG. 3 shows a typical scenario in which the frame buffers of FIG. 2 are used for switching data between an input bitstream IN and three output data streams OUT1, OUT2, and OUT3. For each frame of the streams, it is indicated which one of the three frame buffers 1–3 of FIG. 2 that is designated by the pointers for read/write access. To be noted, in FIGS. 3–7, it is assumed that time passes from left to right in the figures. On the write side, the entire contents of a received frame is written into the buffers in modulo-3 fashion. On the read side, however, the frame buffers identified by the read pointers indicate that the output port have the option of reading data from the particular identified frame buffer. However, if an output port is only to receive data from other input ports than the one associated with the input stream IN, the output port will not actually read any data from the designated frame buffer even though it is identified by the read pointer. To be noted in FIG. 3, no output port read pointer points at, for example, frame buffer 2 during a period of time that the write pointer points at this frame buffer 2, thereby ensuring buffer consistency.

Figure 4:
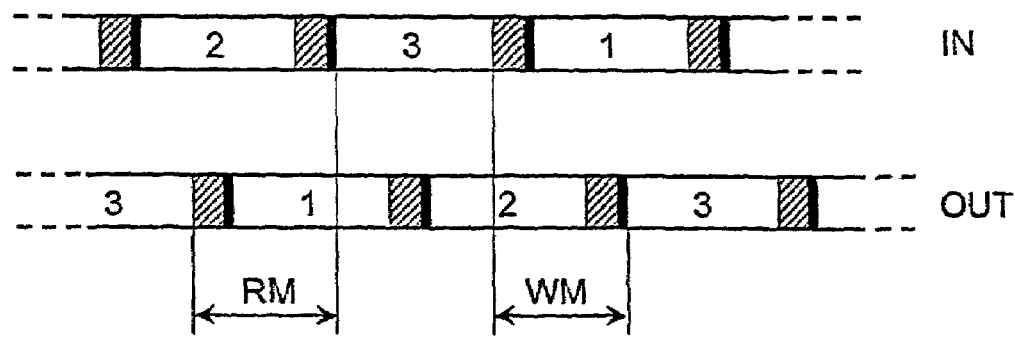
FIG. 4 illustrates data streams for each frame consistent with the present invention.

FIG. 4 shows an input data stream IN and an output data stream OUT and identifies, for each frame of the respective bitstream, which frame buffers of the frame memory in FIG. 2 that the write and read pointer, respectively, currently designates. As is illustrated, to avoid buffer inconsistency, a read margin RM, which is the time interval from when reading of payload data for the output stream from a frame buffer is complete to when writing of a new frame from the input stream into said frame buffer begins, as well as a write margin WM, which is the time interval from when writing of a frame from the input stream into a frame buffer is complete to when reading of payload data for the output stream from said frame buffer begins, must be larger than zero (0). This ensures that data is never written into and read from the same buffer simultaneously.

Figure 5:
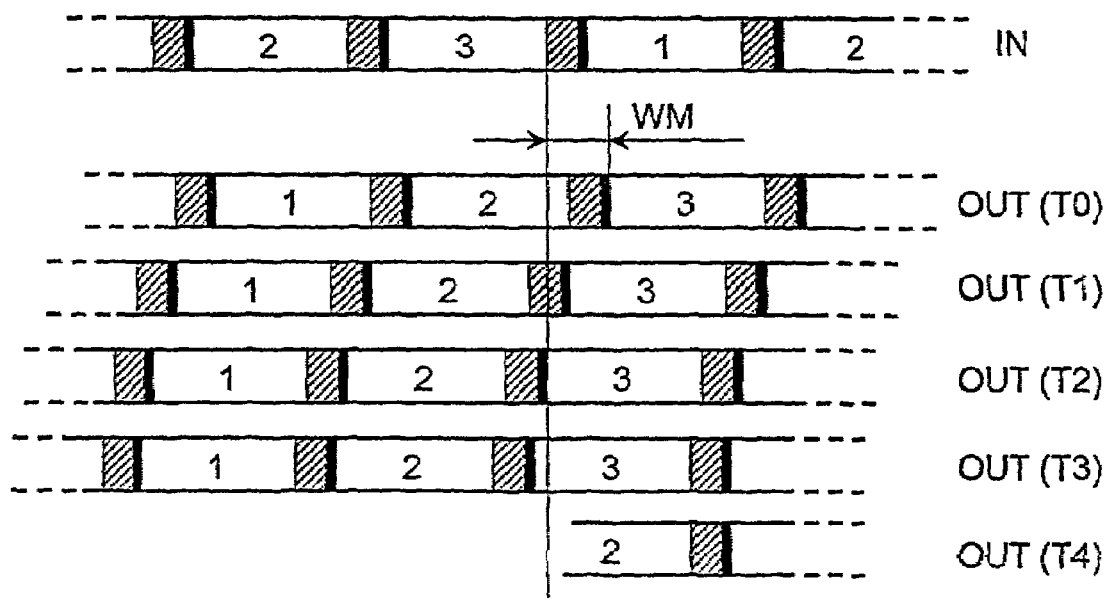
FIG. 5 illustrates a relationship between an input stream and an output stream consistent with the present invention.

FIG. 5 illustrates a situation wherein the input stream and the output stream of FIG. 4 show a small temporary drift or phase deviation in relation to each other, as illustrated by the shifting phase location of the output stream at timings T0–T4. In FIG. 5, the input and output frame start signals are close to each other, causing a potential access conflict at the write margin WM as the read pointer catches up with the write pointer. At T0, the write margin is still on the right side of zero. At T1, although the output frame start signal has caught up with the input frame start signal, the write margin is still on the right side of zero, as the guard band provides for an extra margin. However, at T2, the write margin has decreased to zero, and at T3, the changed phase relationship has lead to buffer inconsistency, wherein frame buffer 3 is accessed for read and write simultaneously. Therefore, a so-called frame slip is generated, causing the read pointer to be retracted one step so as to eliminate the buffer inconsistency, as indicated at T4.

Figure 6:
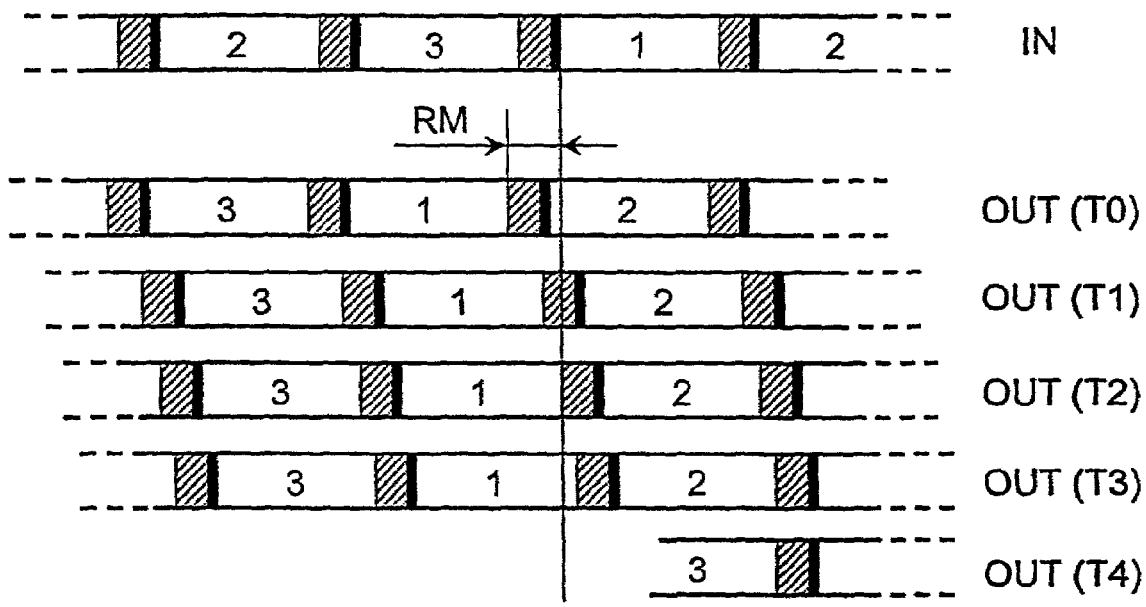
FIG. 6 illustrates input and output signals consistent with the present invention.

FIG. 6 illustrates a similar situation wherein the input and output frame start signals are close to each other, in this case causing a potential access conflict at the read margin RM as the input frame start signal catches up with the output frame start signal. At T0, the read margin is on the right side of zero. At T1, although the input frame start signal has caught up with the output frame start signal, the read margin is still on the right side of zero, as the guard band provides for an extra margin. However, at T2, the read margin has decreased to zero, and at T3, the occasional drift has lead to a buffer inconsistency state, wherein frame buffer 1 is accessed for read and write simultaneously. Therefore, a frame slip is generated, causing the read pointer to be advanced one step so as to eliminate the buffer inconsistency state, as indicated at T4.

Figure 7:
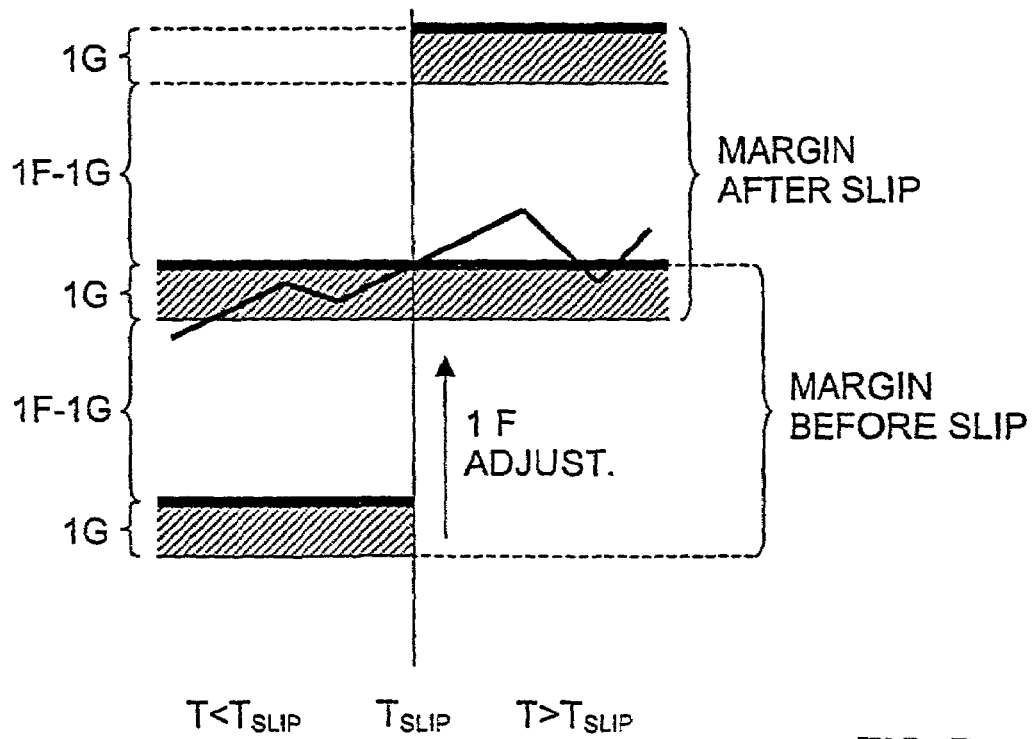
FIG. 7 illustrates phase variation margins consistent with the present invention.

As an alternative way to exemplify what happens at a slip, the diagram of FIG. 7 illustrates phase variation margins in relation to the read/write frame phase relation, the latter being illustrated as a thick curve in the diagram. In FIG. 7, at $T<T_{SLIP}$, it is assumed that, for example, the input frame start signal of an input data stream occurs (in time) simultaneously with the ending of the payload close to the beginning of the guard band of the frames of an output data stream receiving data from said input stream. Thus, depending on the direction of any occurring phase variation between the two streams, there is a drift margin equivalent to either one guard band or one entire frame. In FIG. 7, the variation is assumed to be in the worst-case direction (upward in FIG. 7), and at $T_{SLIP}$, the one guard band margin is exhausted, thereby causing the generation of a slip. With the slip, a read pointer adjustment of one full frame is made. This will mean that we will either transmit the same data twice, as was the case in FIG. 5, or data is lost, as was the case in FIG. 6. To be noted, other output ports that read from the same buffer remain unaffected, and the same holds for the collection of data for said output bitstream from other input ports. As a result of the slip, the margin is shifted one frame in the direction of the drift. In other words, immediately after the slip, there will be a drift margin equivalent to one frame in the direction of drift that caused the slip, and a drift margin of one guard band in the direction opposite to the one that caused the slip.

Figure 8:
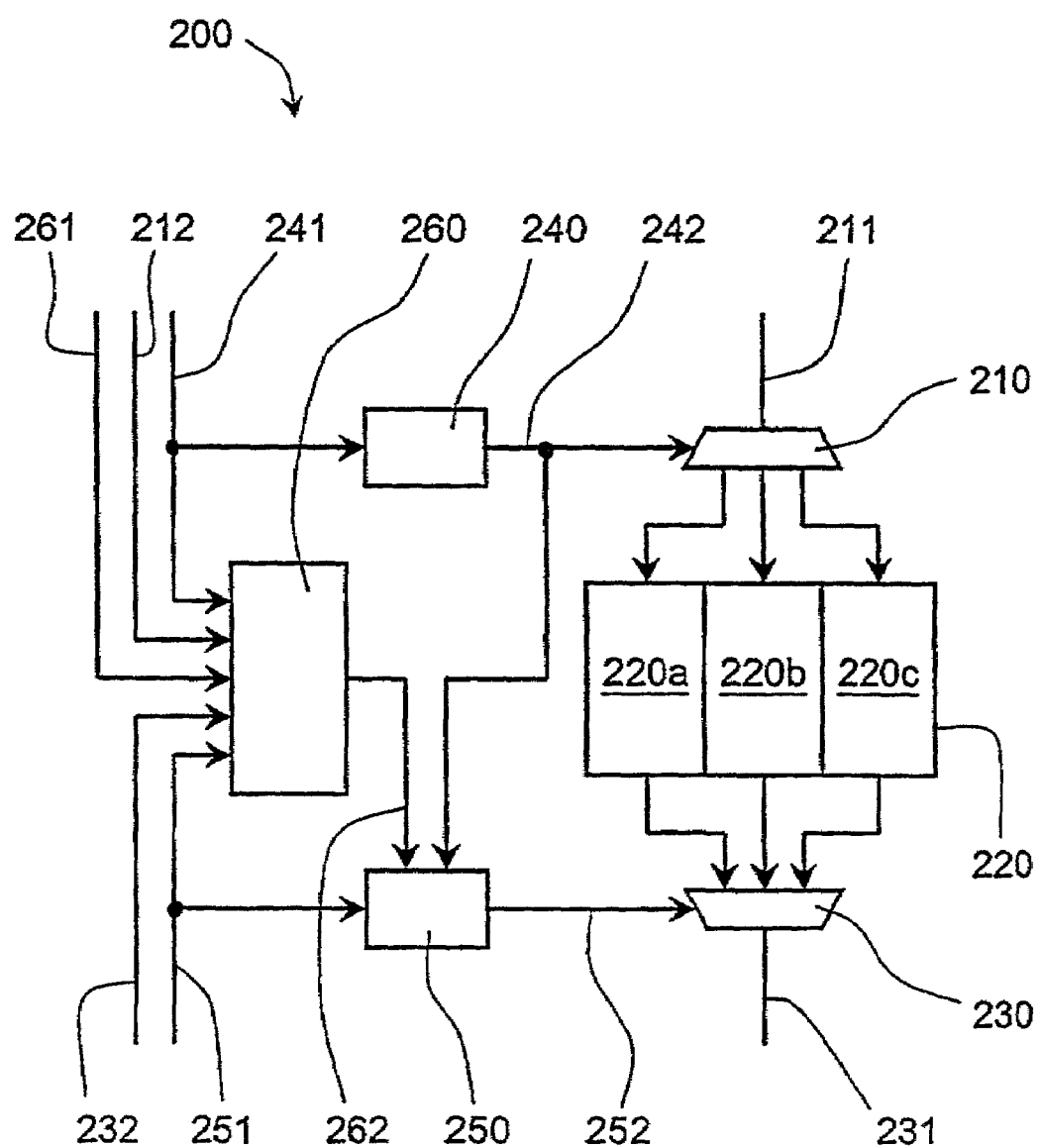
FIG. 8 illustrates a buffer sequencing apparatus consistent with the present invention.

FIG. 8 schematically shows a buffer sequencing apparatus 200, illustrating components used to access a frame memory 220, comprising frame buffers 220a–220c, with respect to one input/output port combination. In addition to the frame memory 220, the apparatus comprises a write buffer select counter 240, an input demultiplexor 210, a read buffer select counter 250, an output multiplexor 230, and a buffer sequencing state machine 260.

During operation, the state machine 260 receives an input frame start signal 241, an write access signal 212, a reset signal 261, an output frame start signal 251, and a read access signal 232.

The input frame start signal 241 indicates occurrences of the frame start signal of the data stream that is received at the input port, and is provided to the state machine 260 and to the write buffer select counter 240 that uses it to trigger advancement of a modulo-3 pointer that forms output to the demultiplexor 210. The demultiplexor 210 forwards payload data 211 received in frames of at the input port to a frame buffer as identified by the modulo-3 pointer from the counter 240. The output pointer from the write buffer select counter 240 is also provided to the read buffer select counter 250.

The write access signal 212 is active over a period of time during which payload data is actually being written into one of the frame buffers. To be noted, a small period of time, essentially corresponding to the duration of the guard band, will pass between the point in time at which the writing of payload data into a buffer is complete and a next occurrence of the input frame start signal.

The reset signal 261 is used to reset the operation of the state machine 260, as will be discussed more in detail below.

The output frame start signal 251 indicates occurrences of the frame start signal of the output data stream that is to be transmitted from the output port. It is provided to the state machine 260 and to the read buffer select counter 250, which uses it to trigger advancement of a modulo-3 pointer that forms output to the multiplexor 230. The multiplexor 230 forwards data, collected from the frame buffer identified by the modulo-3 pointer from the counter 250, to the output port.

The read access signal 232 is active over a period of time during which the frame memory is actually being accessed for data retrieval (read accessed) for the output port. To be noted, a small period of time, essentially corresponding to the duration of the guard band, will pass between the point in time at which the reading of payload data for a frame is complete and the next occurrence of the output frame start signal.

Figure 9:
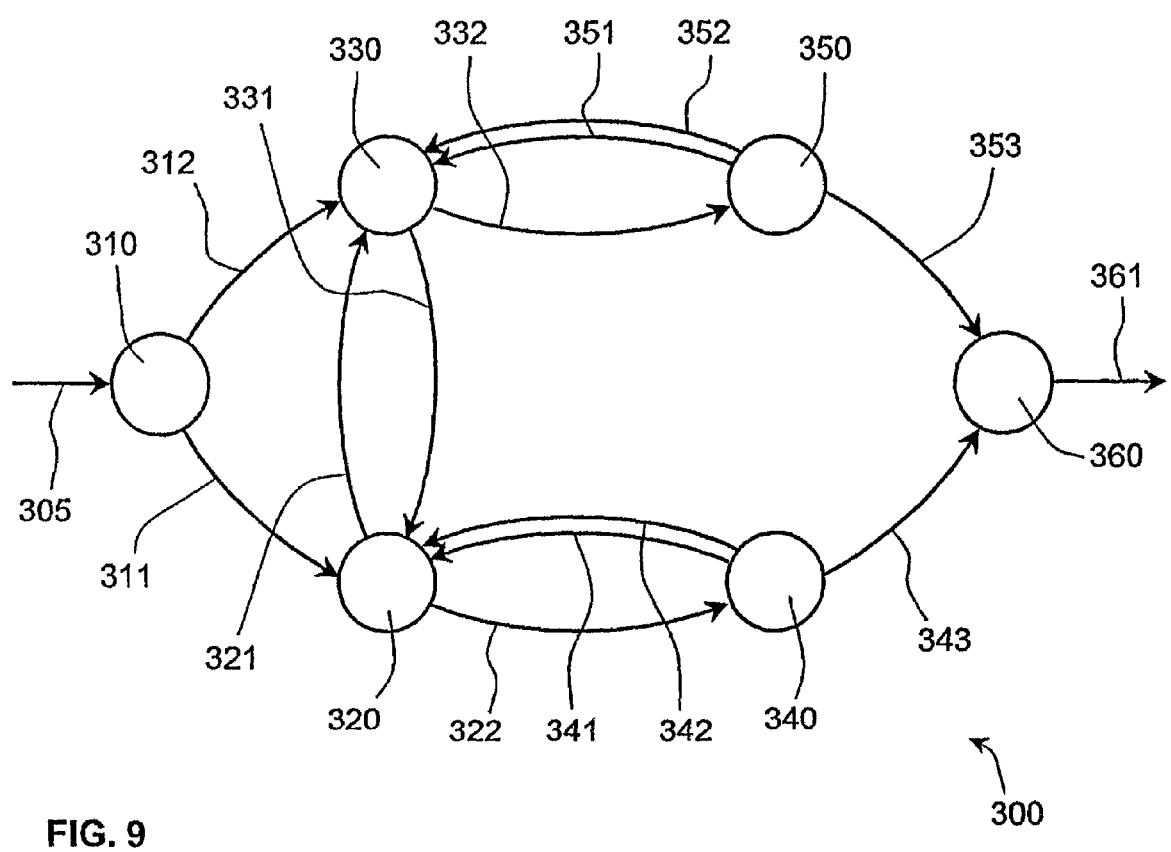
FIG. 9 illustrates the operation of a state machine consistent with the present invention.

Based upon the above-mentioned inputs, the state machine 260 is arranged to provide a control signal 262 to the read buffer select counter 250, which uses the control signal 262, as well as the write pointer provided from the write buffer select counter 240, to adjust the pointer provided to the multiplexor 230, as will be described more in detail below with reference to FIG. 9.

The operation of the state machine 260 of FIG. 8 will now be described with reference to FIG. 9. The operation of the state machine begins with the reception of a reset signal 305 (corresponding to signal 261 in FIG. 8) that causes the state machine to enter into a so-called initial state 310. In the initial state, the state machine determines which signal that occurs first, the input frame start signal (241 in FIG. 8) or the output frame start signal (251 in FIG. 8).

If the input frame start signal is received first, thereby causing the write pointer to advance one frame buffer, the state machine sends a control signal to the read buffer, instructing it to position its read pointer two frame buffers behind (i.e. one frame buffer ahead in modulo-3) the frame buffer currently pointed out by the write pointer, and enters (transition 311) into a so-called read-wait state 320. In the read-wait state, the state machine expects to receive an output frame in this case as next input signal.

Similarly, if the output frame start signal in this case is received first, thereby causing the read pointer to advance one frame buffer, the state machine sends a control signal to the read buffer, instructing it to position its read pointer two frame buffers ahead (i.e. one frame buffer behind in modulo-3) of the frame buffer currently pointed out by the write pointer, and enters (transition 312) into a so-called write-wait state 330. In the write-wait state, the state machine expects to receive an input frame start signal as next input signal.

As a next step, if the first signal received when in the read-wait state 320 is an output frame start signal (as expected), the state machine enters into the write-wait state 330 (transition 321). Also, note that the output frame start signal will cause the read buffer select counter to advance the read pointer one frame. Similarity, if the first signal received when in the write-wait state 330 is an input frame start signal (as expected), the state machine enters into the read-wait state 320 (transition 331). The input frame start signal will then also cause the write buffer select counter to advance the write pointer one frame. Consequently, during normal operation when the output and input frame start signals are received alternately as expected, the state machine will simple go back an forth between the read-wait state 320 and the write-wait state 330.

However, if the first signal received when in the read-wait state 320 is an input frame start signal, thus indicated that a write catch-up has occurred, i.e. that the input frame has moved ahead of the output frame, the state machine enters (transition 322) into a so-called potential buffer inconsistency state 340, also referred to as a write-catch-up state. Note that the input frame start signal will in this situation have caused the write buffer select counter to advance the write pointer into designating the same frame buffer as the one currently designated by the read pointer, thereby causing a state of potential access conflict.

In the write-catch-up state 340, an actual buffer consistency violation will only take place if the buffer is actually still accessed for reading of data to the output port that the state machine refers to. In other words, if the read access has already retrieved all requested payload data and has hence reached the guard band safe zone, no actual violation will occur and the operation is still on the correct side of the read margin. Consequently, if the read access signal (232 in FIG. 8) is still active when entering the write-catch-up state 340, then a buffer inconsistency violation has occurred and a frame slip is generated (transition 341). During the slip transition 341, the state machine instructs the read buffer select counter to advance the read pointer one step so that the write pointer will designate a frame buffer that is two steps ahead of, i.e. one step behind, the buffer currently designated by the read pointer. The state machine also generates a slip signal that is provided to such entities or processes that has been determined to need information on such a slip. As the input frame start signal was the last one received, causing said slip, it is now assumed that the next signal to be expected is an output frame start signal, and the slip therefore means a transition to the read-wait state 320.

However, as mentioned, if the read access signal is no longer active, the first signal received when in the write-catch-up state 340 will be an output frame start signal, which will mean that the read buffer select counter will advance the read pointer one step, thereby eliminating the state of potential buffer inconsistency. The state machine will therefore exit the write-catch-up state 340 via transition 342. This transition is based upon the assumption that the write catch-up was only temporary and that the relationship will be reversed to the situation that was present before the write catch-up. Therefore, it will be assumed that the next frame start signal received will be the output frame start signal. The transition 342 consequently leads to the read-wait state 320.

If however the first signal received when in the write-catch-up state 340 is another input frame start signal, it is determined very likely that the output frame sync has been totally lost, and the state machine therefore enters (transition 343) into a link failure state 360. During this transition the state machine transmits a link failure signal to such entities or processes that has been determined to need information thereon. The state machine then has to be reset (transitions 361, 305) to resume normal operation.

In a similar manner, if the first signal received when in the write-wait state 330 is an output frame start signal, thus indicated that a read catch-up has occurred in which the output frame has drifted ahead of the input frame, the state machine enters (transition 332) into another buffer inconsistency state 350, also referred to as a read-catch-up state. Note that the output frame start signal will in this situation have caused the read buffer select counter to advance the read pointer into designating the same frame buffer as the one currently designated by the write pointer, thereby causing said state of potential access conflict.

In the read-catch-up state 350, an actual buffer consistency violation will only take place if the buffer is actually still accessed for writing of payload data thereinto. Consequently, when having entered the read-catch-up state 350, if the write access signal (212 in FIG. 8) designates that the buffer is still used for writing of payload data thereinto, i.e. the input side has not yet reached the "guard band margin", then a buffer consistency violation is determined to have occurred and a frame slip is generated (transition 351). As the output frame start signal was the last one received, it is now assumed that the next signal to be expected is an input frame start signal, and the slip therefore means a transition to the write-wait state 330. During the slip transition 351, the state machine instructs the read buffer select counter to retract the read pointer one step so that the read pointer will designate a frame buffer that is two steps ahead of, i.e. one step behind, the buffer currently designated by the write pointer. The state machine also generates a slip signal that is provided to such entities or processes that has been determined to need information on such a slip.

However, as mentioned, if the write access signal is no longer active, the first signal received when in the read-catch-up state 350 will be an input frame start signal. This will mean that the write buffer select counter will advance the read pointer one step, thereby eliminating the state of potential buffer inconsistency. The state machine will therefore exit the read-catch-up state 350 via transition 352. This transition is based upon the assumption that the read catch-up was only temporary, or at least was confined to the correct side of the above-mentioned write margin and that the drift situation will be reversed to the situation that was present before the read catch-up. Therefore, it will be assumed that the next frame start signal will be the input frame start signal. The transition 352 consequently leads to the write-wait state 330.

If instead the first signal received when in the read-catch-up state 350 is another output frame start signal, it is determined very likely that the input frame start signal has been totally lost, and the state machine therefore enters (transition 353) into the link failure state 360. During this transition, the state machine transmits a link failure signal to such entities or processes that has been determined to need information thereon. The state machine then has to be reset (transitions 361, 305) to resume normal operation.

Figure 10:
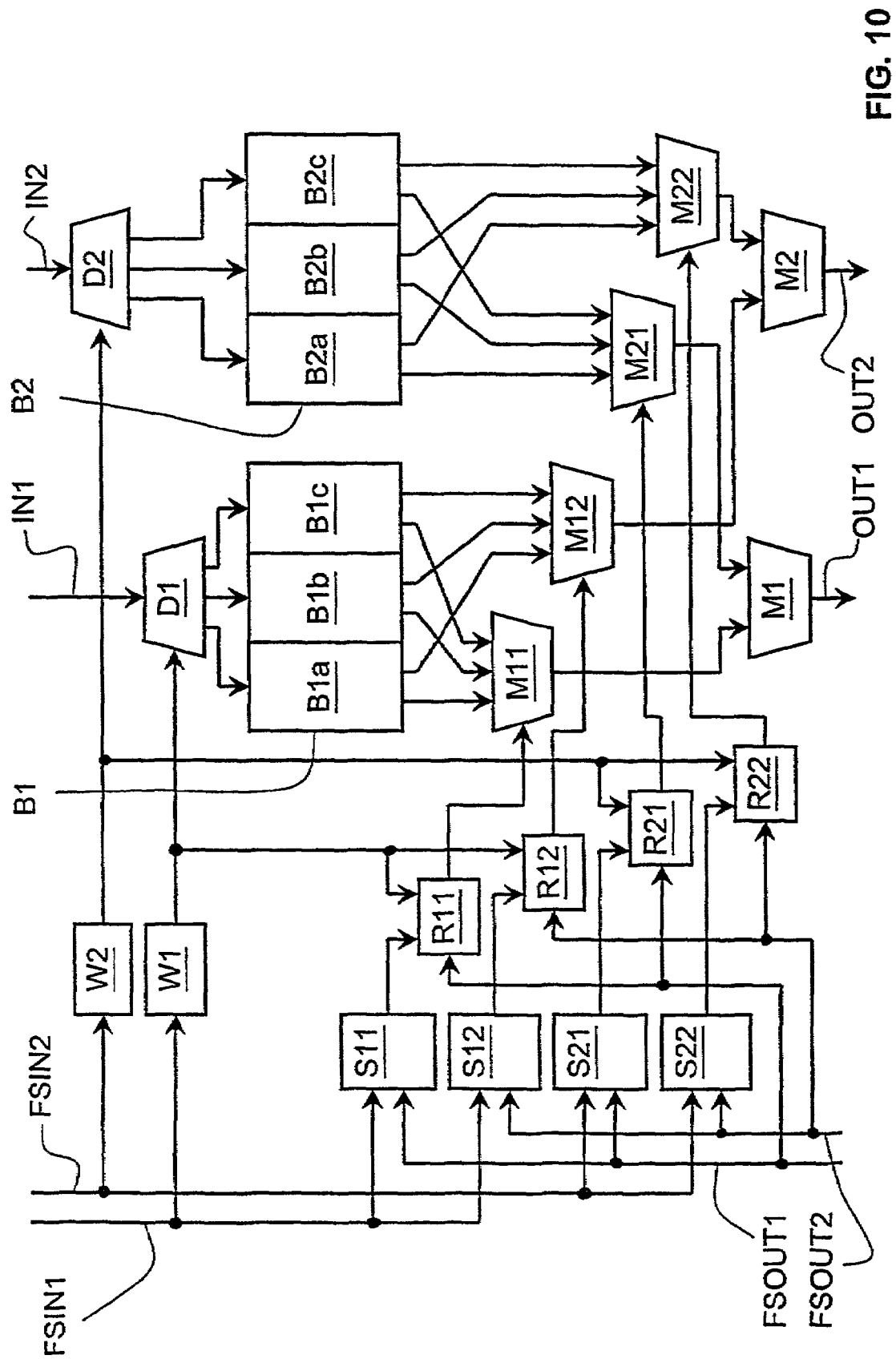
FIG. 10 illustrates a switch for receiving and transmitting data consistent with the present invention.

To exemplify the way in which a read buffer select mechanism are provided for each input/output port combination, FIG. 10 illustrates a switch receiving two input data streams IN1 and IN2 and transmitting two output data stream OUT1 and OUT2.

For each one of the input streams IN1 and IN2, there is provided an input demultiplexor D1 and D2 and a write buffer select counter W1 and W2, respectively, which are arranged to write frames of data into a triple buffered frame memory B1 and B2, respectively, in the same way as the read buffer select counter and the input demultiplexor described above with reference to FIG. 8. The read buffer select counter W1 receives as input an input frame start signal FSIN1 associated with the input stream IN1, and the read buffer select counter W2 receives as input an input frame start signal FSIN2 associated with the input stream IN2.

For retrieving data from the first input stream IN1 to the first output stream OUT1 using the frame memory M1, there is provided a state machine S11, a read buffer select counter R11, and an output multiplexor M11, operating in the same way as the read buffer select counter and the input demultiplexor described above with reference to FIG. 8. Similarly, for retrieving data from the second input stream IN2 to the first output stream OUT1 using the frame memory M2, there is provided a state machine S21, a read buffer select counter R21, and an output multiplexor M21. In addition, another output multiplexor M1 is used to multiplex the signals from the multiplexors M11 and M21 in accordance with mapping instructions from a slot mapping table (not shown). Correspondingly, a similar set of components S12, R12, M12, and M2, are provided for retrieving data from the first input stream IN1 to the second output stream OUT2, and components S22, R22, M22 (and M2) are provided for retrieving data from the second input stream IN 2 to the second output stream OUT2.

Even though exemplifying embodiment of the invention has been described in detail above, modifications, combinations and alterations thereof may be made, as will be clear to those skilled in the art, within the scope of the invention, which is defined by the accompanying claims.

The invention claimed is:

1. A method for controlling data transferring, said method comprising the steps of:
    temporarily storing frames of slots received via an input port of a switch in three or more frame buffers;
    providing a write pointer designating which one of said three or more frame buffers that is currently used for storing a frame of slots that is currently received via said input port;
    providing a read pointer designating which one of said three or more frame buffers that is currently used for reading data to be transmitted from an output port of said switch;
    advancing said write pointer into designating a next one of said three or more frame buffers in a round-robin fashion as a result of each occurrence of a first signal that is related to the start of a next frame of slots that is received via said input port;
    advancing said read pointer into designating a next one of said three or more frame buffers in a round-robin fashion as a result of each occurrence of a second signal that is related to the start of a next frame of slots to be transmitted from said output port;
    initiating said pointers by detecting which one of said first signal and said second signal that is received first in time and adjusting one or both of said pointers so that, if said first signal is received first, the frame buffer designated by said write pointer is at least two frame buffers ahead, in said round-robin fashion, of the frame buffer designated by said read pointer, or, if said second signal is received first, the frame buffer designated by said read pointer is at least two frame buffers ahead, in said round-robin fashion, of the frame buffer designated by said write pointer.

2. A method as claimed in claim 1, wherein the initiating step is performed individually for each input/output port combination of a switch having at least one input port and one or more output ports.

3. A method as claimed in claim 2, further comprising determining an entering into a state of possible frame buffer inconsistency caused by said write pointer being advanced into designating the same frame buffer as the frame buffer designated by said read pointer.

4. A method as claimed in claim 2, further comprising determining an entering into a state of possible frame buffer inconsistency caused by said read pointer being advanced into designating the same frame buffer as the frame buffer designated by said write pointer.

5. A method as claimed in claim 1, further comprising determining an entering into a state of possible frame buffer inconsistency caused by said write pointer being advanced into designating the same frame buffer as the frame buffer designated by said read pointer.

6. A method as claimed in claim 5, comprising affecting, as a result of said entering into said state of possible frame buffer inconsistency, one or both of said pointers so that the frame buffer designated by said write pointer is at least two frame buffers ahead, in said round-robin fashion, of the frame buffer designated by said read pointer.

7. A method as claimed in claim 5, comprising: detecting, in said state of possible frame buffer inconsistency, if said write pointer is advanced into designating a next one of said frame buffers as a result of reception of said first signal; and, if so, causing a buffer consistency violation event.

8. A method as claimed in claim 5, comprising: detecting, in said state of possible frame buffer inconsistency, if the frame buffer designated by said read pointer is accessed for retrieval of time slot data to be transmitted from said output port; and, if so, causing a buffer consistency violation event.

9. A method as claimed in claim 7, wherein said causing a buffer consistency violation event comprises affecting one or both of said pointers so that the frame buffer designated by said write pointer is at least two frame buffers ahead, in said round-robin fashion, of the frame buffer designated by said read pointer.

10. A method as claimed in claim 8, wherein said causing a buffer consistency violation even comprises affecting one or both of said pointers so that the frame buffer designated by said write pointer is at least two frame buffers ahead, in said round-robin fashion, of the frame buffer designated by said read pointer.

11. A method as claimed in claim 5, comprising: detecting, in said state of possible frame buffer inconsistency, if said read pointer is advanced into designating a next one of said frame buffers as a result of reception of said second signal; and, if so, determining said state of possible frame buffer inconsistency as being at least temporarily eliminated.

12. A method as claimed in claim 1, further comprising determining an entering into a state of possible frame buffer inconsistency caused by said read pointer being advanced into designating the same frame buffer as the frame buffer designated by said write pointer.

13. A method as claimed in claim 12, comprising affecting, as a result of said entering into said state of possible frame buffer inconsistency, one or both of said pointers so that the frame buffer currently designated by said read pointer is at least two frame buffers ahead, in said round-robin fashion, of the frame buffer designated by said write pointer.

14. A method as claimed in claim 12, comprising: detecting, in said state of possible frame buffer inconsistency, if said read pointer is advanced into designating a next one of said frame buffers as a result of reception of said second signal; and, if so, causing a buffer consistency violation event.

15. A method as claimed in claim 12, comprising: detecting, in said state of possible frame buffer inconsistency, if the frame buffer designated by said write pointer is accessed for storing a frame of data that is currently received via said input port; and, if so, causing a buffer consistency violation event.

16. A method as claimed in claim 14, wherein said causing a buffer consistency violation event comprises affecting one or both of said pointers so that the frame buffer designated by said read pointer is at least two frame buffers ahead, in said round-robin fashion, of the frame buffer designated by said write pointer.

17. A method as claimed in claim 12, comprising:
    detecting, in said state of possible frame buffer inconsistency, if said write pointer is advanced into designating a next one of said frame buffers as a result of reception of said first signal; and, if so,
    determining said state of possible frame buffer inconsistency as being at least temporarily eliminated.

18. A method as claimed in claim 15, wherein said causing a buffer consistency violation even comprises affecting one or both of said pointers so that the frame buffer designated by said read pointer is at least two frame buffers ahead, in said round-robin fashion, of the frame buffer designated by said write pointer.

19. A method as claimed in claim 6, 9, 13, 16, 3, 10, 4, or 18, comprising generating, if said affecting is performed, a signal indicating that a frame slip has occurred.

20. A method as claimed in claim 19, wherein said affecting of one or more of said pointers comprises affecting only said read pointer.

21. A method as claimed in claim 6, 7, 13, 16, 3, 10, 4, or 18 wherein said affecting of one or more of said pointers comprises affecting only said read pointer.

22. A method for controlling data switching, said method comprising the steps of:
  temporarily storing frames of slots received via an input port of a switch in three or more frame buffers;
  providing a write pointer designating which one of said three or more frame buffers that is currently used for storing a frame of slots that is currently received via said input port;
  providing a read pointer designating which one of said three or more frame buffers that is currently used for reading data to be transmitted from an output port of said switch;
  advancing said write pointer into designating a next one of said three or more frame buffers in a round-robin fashion as a result of each reception of a first signal that is related to the start of a next frame of slots that is received via said input port;
  advancing said read pointer into designating a next one of said three or more frame buffers in a round-robin fashion as a result of each reception of a second signal that is related to the start of a next frame of slots to be transmitted from said output port;
  determining if one of said pointers is advanced into designating the same frame buffer as the frame buffer designated by the other one of said pointers, thereby causing a state of possible frame buffer inconsistency.

23. A method as claimed in claim 22, comprising detecting, in said state of possible frame buffer inconsistency, an event implying an actual buffer consistency violation.

24. A method as claimed in claim 22, comprising affecting, if said event is detected, one or both of said pointers so that the frame buffer designated by the pointer that was advanced last is at least two frame buffers ahead, in said round-robin fashion, of the frame buffer designated by the other pointer.

25. A method as claimed in claim 23, comprising generating, if said event is detected, a signal indicating that a buffer consistency violation has occurred.

26. A method as claimed in claim 23, comprising generating, if said event is detected, a signal indicating that a frame slip has occurred.

27. A method as claimed in claim 24, wherein said affecting of one or more of said pointers comprises affecting only said read pointer.

28. An apparatus for switching data between ports of said apparatus, said apparatus comprising:
  storage means providing three or more frame buffers to be used for temporarily storing frames of slots received via an input port of said apparatus;
  write pointer means for designating which one of said three or more frame buffers that is currently used for storing a frame of slots that is currently received via said input port, said write pointer means being arranged to advance to designate a next one of said three or more frame buffers in a round-robin fashion as a result of each reception of a first signal that is related to the start of a next frame of slots that is received at said input port;
  read pointer means for designating which one of said three or more frame buffers that is currently used for reading data to be transmitted from an output port of said apparatus, said read pointer means being arranged to advance to designate a next one of said three or more frame buffers in a round-robin fashion as a result of each reception of a second signal that is related to the start of a next frame of slots to be transmitted from said output port; and
  control means for controlling the operation of said pointer means, said control means being arranged initiate said read pointer means by detecting which one of said first signal and said second signal that is received first in time after a selected point in time and to control one or both of said pointer means so that, if said first signal is received first, the frame buffer designated by said write pointer means is at least two frame buffers ahead, in said round-robin fashion, of the frame buffer designated by said read pointer means, or so that, if said second signal is received first, the frame buffer designated by said read pointer means is at least two frame buffers ahead, in said round-robin fashion, of the frame buffer designated by said write pointer means.

29. An apparatus as claimed in claim 28, wherein said second signal is synchronized according to said first signal in such a way that: a) said second signal is permitted to show an arbitrary phase difference in relation to the said first signal; b) said second signal is permitted to show an acceptable phase jitter in relation to said first signal; and c) said second signal is not permitted to show any persistent phase drift in relation to said first signal.

30. An apparatus for transferring time slot data between ports of a switch, said apparatus comprising:
  means for temporarily storing frames of slots received via an input port of a switch in three or more frame buffers;
  means for providing a write pointer designating which one of said three or more frame buffers that is currently used for storing a frame of slots that is currently received via said input port;
  means for providing a read pointer designating which one of said three or more frame buffers that is currently used for reading data to be transmitted from an output port of said switch;
  means for advancing said write pointer into designating a next one of said three or more frame buffers in a round-robin fashion as a result of each reception of a first signal that is related to the start of a next frame of slots that is received via said input port;
  means for advancing said read pointer into designating a next one of said three or more frame buffers in a round-robin fashion as a result of each reception of a second signal that is related to the start of a next frame of slots to be transmitted from said output port;
  means for determining if one of said pointers is advanced into designating the same frame buffer as the frame buffer designated by the other one of said pointers, thereby causing a state of possible frame buffer inconsistency.

31. An apparatus for transferring time slot data between ports of a switch, said apparatus comprising:
  means for temporarily storing frames of slots received via an input port of a switch in three or more frame buffers;
  means for providing a write pointer designating which one of said three or more frame buffers that is currently used for storing a frame of slots that is currently received via said input port;
  means for providing a read pointer designating which one of said three or more frame buffers that is currently used for reading data to be transmitted from an output port of said switch;

means for advancing said write pointer into designating a next one of said three or more frame buffers in a round-robin fashion as a result of each occurrence of a first signal that is related to the start of a next frame of slots that is received via said input port;

means for advancing said read pointer into designating a next one of said three or more frame buffers in a round-robin fashion as a result of each occurrence of a second signal that is related to the start of a next frame of slots to be transmitted from said output port;

means for initiating said pointers by detecting which one of said first signal and said second signal that is received first in time and adjusting one or both of said pointers so that, if said first signal is received first, the frame buffer designated by said write pointer is at least two frame buffers ahead, in said round-robin fashion, of the frame buffer designated by said read pointer, or, if said second signal is received first, the frame buffer designated by said read pointer is at least two frame buffers ahead, in said round-robin fashion, of the frame buffer designated by said write pointer.

32. An apparatus as claimed in claims 28, 31, or 30, comprising: N input ports and M output ports; N write pointer means of the above mentioned kind, each one being provided to operate in relation to a respective input port; N storing means of the above mentioned kind, each one being provided to temporarily store frames of time slot data received at a respective input port; N×M read pointer means of the above mentioned kind, each one being provided to operate in relation to a respective input/output port combination; and N×M control means of the above mentioned kind, each one being provided to operate in relation to a respective input/output port combination.

33. An apparatus as claimed in claim 28, 31, or 30, wherein said second signal is synchronized according to said first signal in such a way that: a) said second signal is permitted to show an arbitrary phase difference in relation to said first signal; b) said second signal is permitted to show an acceptable phase jitter in relation to said first signal; and c) said second signal is not permitted to show any persistent phase drift in relation to said first signal.

* * * * *